United States Patent [19]

Sorimachi et al.

[11] Patent Number: 4,707,642
[45] Date of Patent: Nov. 17, 1987

[54] ACTUATING DEVICE

[75] Inventors: Kanehiro Sorimachi; Joji Amitani, both of Yokohama, Japan

[73] Assignee: Canon Kabushiki Kaisha, Tokyo, Japan

[21] Appl. No.: 788,653

[22] Filed: Oct. 14, 1985

Related U.S. Application Data

[63] Continuation of Ser. No. 583,884, Feb. 27, 1984, abandoned.

[30] Foreign Application Priority Data

Mar. 3, 1983 [JP] Japan .................................. 58-35081
Mar. 3, 1983 [JP] Japan .................................. 58-35082

[51] Int. Cl.$^4$ ............................................ H02K 33/00
[52] U.S. Cl. ...................................... 318/37; 318/115; 310/12
[58] Field of Search ................. 310/40, 261; 318/115, 318/34, 35, 37, 38

[56] References Cited

U.S. PATENT DOCUMENTS

| 2,377,175 | 5/1948 | Peer | 318/115 X |
| 3,087,772 | 4/1963 | Ascoli | 310/36 X |
| 3,609,422 | 9/1971 | Nordin | 310/82 |
| 3,869,625 | 3/1975 | Sawyer | 318/115 X |
| 3,881,139 | 4/1975 | Inaba | 318/115 X |
| 3,889,165 | 6/1975 | Van | 318/115 |
| 4,056,760 | 11/1977 | Frenk | 318/34 X |
| 4,197,488 | 4/1980 | Kant | 318/115 |
| 4,421,997 | 12/1983 | Forys | 318/115 X |

FOREIGN PATENT DOCUMENTS

| 657539 | 4/1979 | U.S.S.R. | 318/115 |
| 951586 | 8/1982 | U.S.S.R. | 310/261 |

Primary Examiner—Donovan F. Duggan
Attorney, Agent, or Firm—Fitzpatrick, Cella, Harper & Scinto

[57] ABSTRACT

An actuating device comprises a three-dimensionally movable member, a support member for supporting the movable member and an induction unit for imparting an induction force to at least one of the movable member and the support member to three-dimensionally move the movable member relative to the support member.

7 Claims, 11 Drawing Figures

ACTUATING DEVICE

This application is a continuation of application Ser. No. 583,884, filed Feb. 27, 1984, now abandoned.

BACKGROUND OF THE INVENTION

1. Field of the Invention

The present invention relates to an actuating device having a high degree of freedom of movement.

2. Description of the Prior Art

Figure 1:
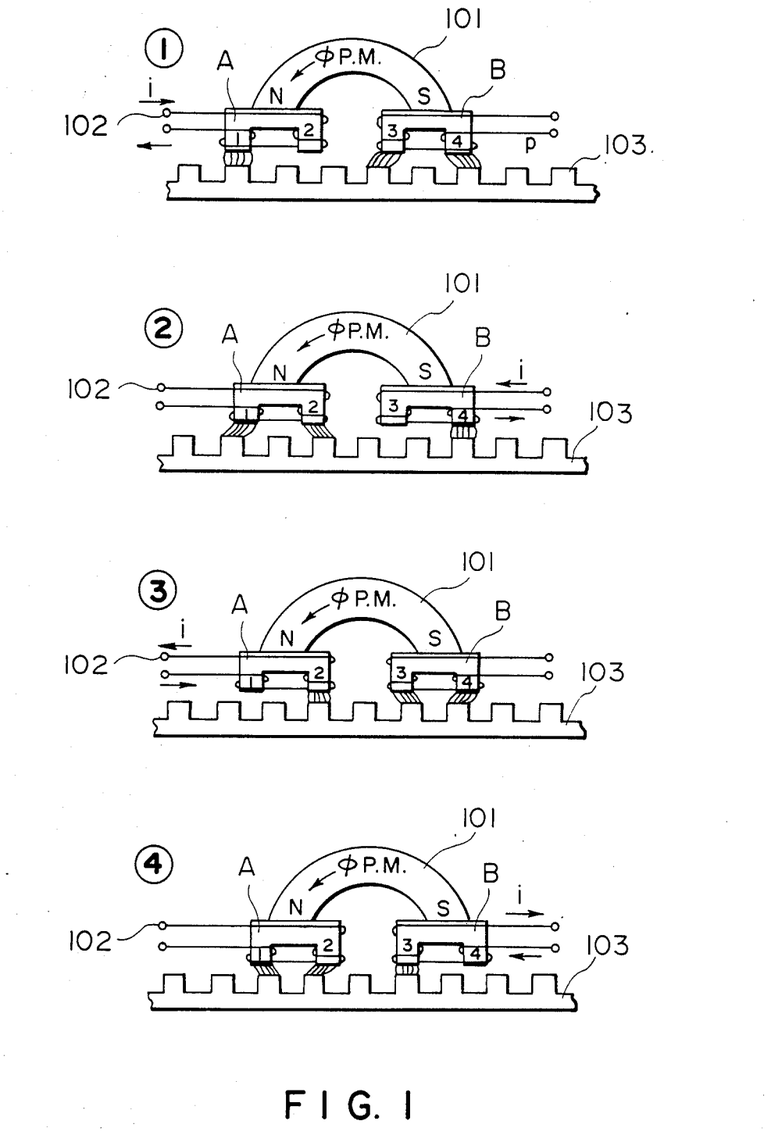
FIG. 1 shows a construction of a linear pulse motor.
Figure 2:
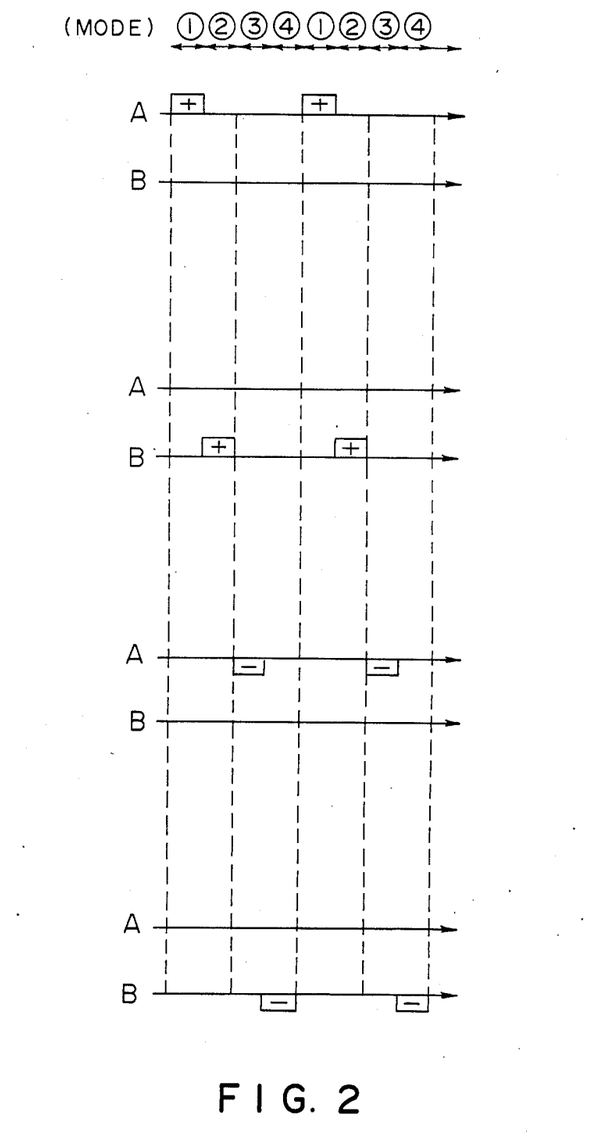
FIG. 2 shows control signals to the linear pulse motor.

In a prior art actuating device such as a linear pulse motor, as shown in FIGS. 1 and 2, a slider 101 is moved on scale teeth 103 by supplying a current i through a control signal line 102 connected to the slider 101. By repeating modes ①-④ of FIG. 1, magnetic fluxes of magnetic poles 1-4 are combined with magnetic fluxes of a permanent magnet PM so that a stable position between the slider 101 and the scale teeth 103 is sequentially shifted. In the mode ① of FIG. 1, a positive (+) current is supplied to a coil A and the magnetic flux is maximum at the pole 1 (the magnetic flux of the PM+ the magnetic flux of the coil A), and the pole 1 is the stable position. The magnetic flux at the pole 2 is zero (the magnetic flux of the PM− the magnetic flux of the coil A), and the magnetic forces at the poles 3 and 4 are balanced. In the mode ②, the positive (+) current is supplied to a coil B, and the magnetic forces at the poles 1 and 2 are balanced, the magnetic flux at the pole 3 is zero (the magnetic flux of the PM− the magnetic flux of the coil B) and the magnetic flux at the pole 4 is maximum. Thus, the pole 4 is the stable position. In the mode ③, a negative (−) current is supplied to the coil A, and the magnetic flux at the pole 1 is zero (the magnetic flux of the PM− the magnetic flux of the coil A), the magnetic flux at the pole 2 is maximum (the magnetic flux of the PM+ the magnetic flux of the coil A), and the magnetic forces at the poles 3 and 4 are balanced. Thus, the pole 2 is the stable position. In the mode ④, the negative (−) current is supplied to the coil B, and the magnetic flux at the pole 3 is maximum (the magnetic flux of the PM+ the magnetic flux of the coil B), the magnetic flux at the pole 4 is zero (the magnetic flux of the PM− the magnetic flux of the coil (B). Thus, the pole 3 is the stable position.

Thus, by supplying the currents to the coils A and B in the sequence of the modes ①, ②, ③ and ④ shown in FIGS. 1 and 2, the stable position is sequentially shifted in the sequence of the poles 1, 4, 2 and 3 and the slider 101 is moved relative to the scale teeth 103.

The stable position is shifted by P/4 per step, where P is a pitch of the scale teeth 103.

Figure 3:
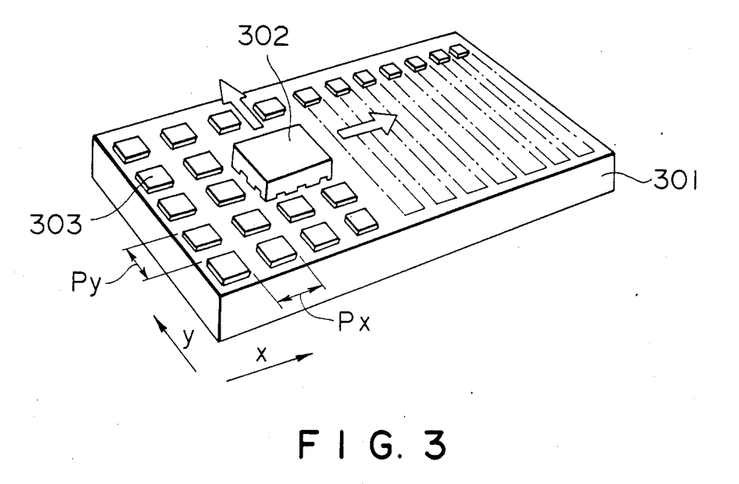
FIG. 3 illustrates a principle of a planar motor.

FIG. 3 illustrates a principle of a two-axis linear motor (plane motor) in which the principle of the linear pulse motor is extended to a two-dimensional plane. Projecting (e.g. square-shaped) scale teeth 303 are arranged in a matrix in x and y directions on a surface of a planar plate 301. A slider (302) (corresponding to the slider 101 of FIG. 1) which has signal lines (not shown) for the x and y directions and a plurality of magnetic poles (not shown) is arranged on the scale teeth 303 in a manner to allow smooth movement of the slider in the x and y directions so that the slider is directly moved in the x and y directions. In such an actuating device, a high degree of freedom of movement is not attained.

SUMMARY OF THE INVENTION

It is an object of the present invention to provide an actuating device such as a motor which solves the above problems.

It is another object of the present invention to provide a three-dimensional actuating device of a simple construction without using a plurality of motors or a complex transmission system such as a clutch or a bevel gear.

It is other object of the present invention to provide a three-dimentional actuating device such as a motor.

It is a further object of the present invention to provide an actuating device which is simple in construction and applicable to the orticulation of a robot.

The above and other objects of the present invention will be apparent from the following description of the invention.

DETAILED DESCRIPTION OF THE PREFERRED EMBODIMENTS

Figure 4:
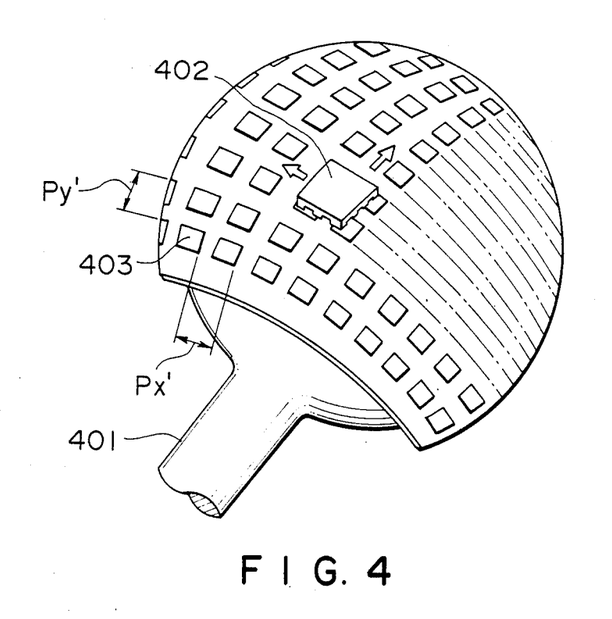
FIG. 4 illustrates a principle of a motor of the present invention.

FIG. 4 illustrates a principle of the present invention. Projecting pattern teeth 403 having a regularity within a certain solid angle are arranged over an entire surface of a spherical support 401. A slider 402 corresponding to the slider 302 shown in FIG. 3 is smoothly slidably arranged above the pattern teeth 403 with a predetermined space (e.g. 0.1–0.3 mm) therefrom.

Thus, like the two-dimensional planar motor of FIG. 3, the slider 402 is three-dimensionally driven on the spherical support 401 or the spherical surface. By arranging the slider 402 concentrically with the pattern teeth 403 and controlling magnetic poles (not shown) in a predetermined pattern, pitches Px' and Py' on the spherical surface of the pattern teeth 403 can be arbitrarily selected.

By defining the spherical surface corresponding to a solid angle centered at the center of the sphere, the pattern can be expanded to cover the entire spherical surface.

Figure 5:
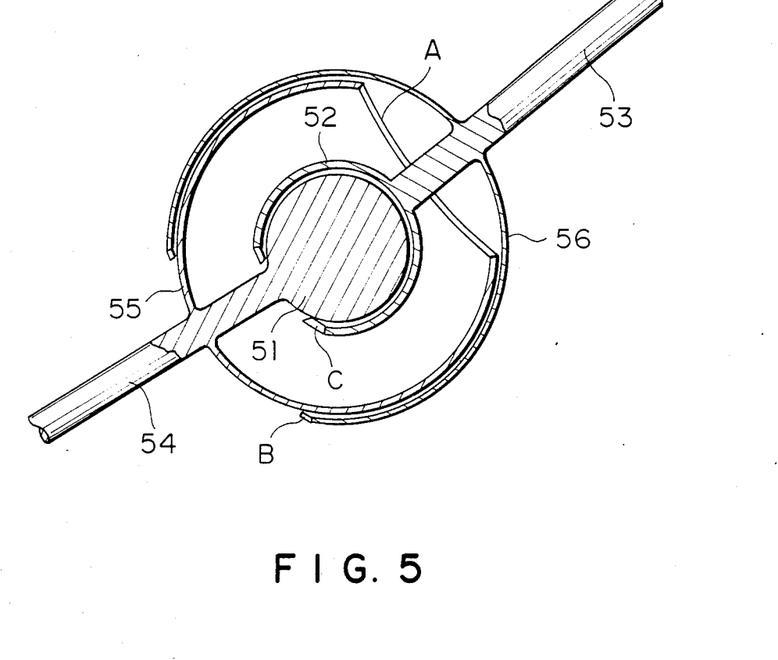
FIG. 5 shows one embodiment of the present invention.

FIG. 5 shows one embodiment of the present invention. A ball bearing is constructed by a sphere 51 and a spherical bearing 52 and a shell-shaped pattern member 55 is connected to a support shaft 54 and a shell-shaped driven member 56 is connected to a movable shaft 53. The transmission of a force between the support shaft 54 and the movable shaft 53 is done through the ball bearing, and the driver between the support shaft and the movable shaft is controlled by the pattern on the outer surface of the pattern member 55 and the magnetic poles on the inner surface of the driven member 56. Openings A, B and C of the shells and the ball bearing are dead zones for the support shaft and the movable shaft.

Figure 6:
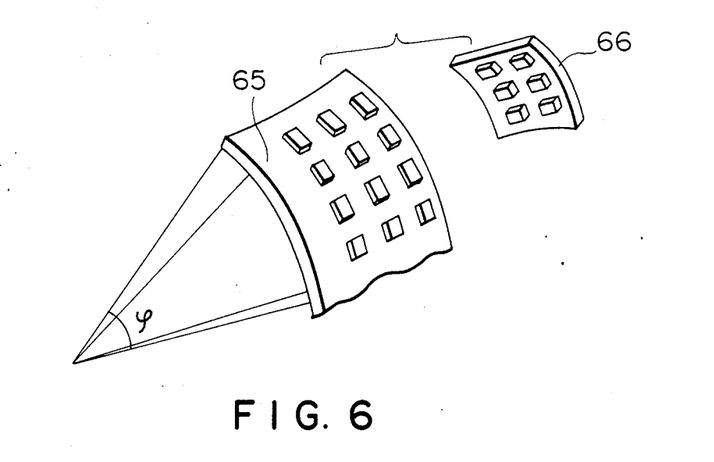
FIG. 6 shows a relationship between a pattern member 65 and a driven member 66.

Patterns of the pattern 55 and the driven member 56 are shown at 65 and 66 in FIG. 6. For a solid angle $\phi$ of the spherical shell, the driven member 56 can be directly driven by controlling the magnetic fields of the pattern member 65 and the driven member 66 (address control by coordinates). When the pitches P'x and P'y (FIG. 4) of the pattern are n=4 represented by an output precision P'x/n (where n is a natural number), a precision of the movable shaft 53 of approximately 10 $\mu$m can be obtained. The magnetic field control may be carried out by controlling the currents supplied to the coils by a CPU (not shown) in a manner shown in FIG. 1. The control means may be arranged in the joint such as the ball bearing or in a support body. When the motor is used in electronic equipment such as an electronic file or a microwave oven, the control unit may be arranged in a main body of the equipment or may be controlled by a peripheral CPU.

Figure 7:
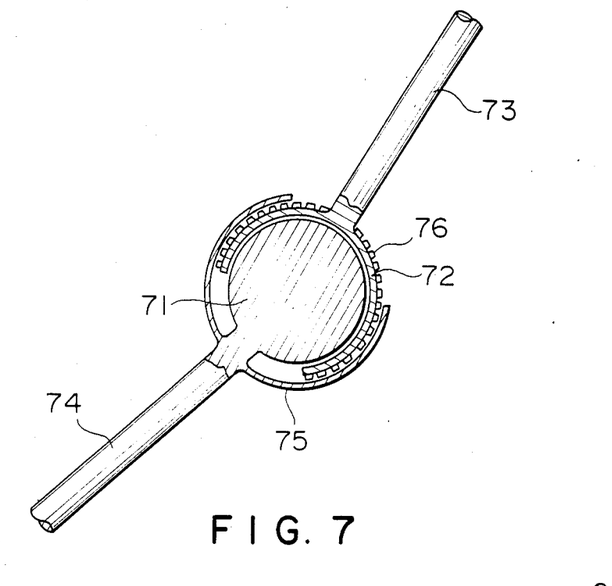
FIG. 7 shows another embodiment of the present invention.

FIG. 7 shows another embodiment of the present invention. It comprises a support shaft 74, a sphere 71 coupled to the support shaft 74, a shell-shaped driven member 75, a movable shaft 73, a spherical bearing 72 connected to the movable shaft 73 and a control pattern member 76 on an outer surface of the spherical bearing 72. Since the pattern is arranged on the outer surface of the spherical bearing, the number of shells is reduced and the structure is simplified.

Figure 8:
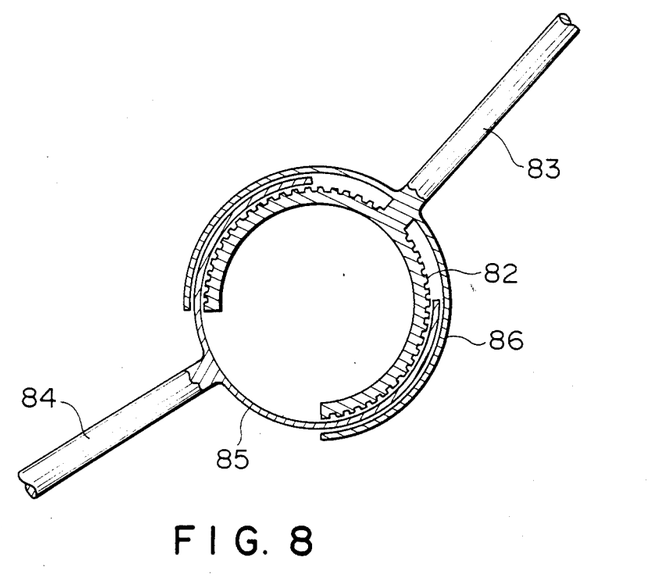
FIG. 8 shows another embodiment of the present invention.

FIG. 8 shows another embodiment. It comprises a support shaft 84, a spherical shell 85 connected to the support shaft, a movable shaft 83, a spherical bearing 86 connected to the movable shaft and a shell-shaped pattern member 82 on an inner surface of the spherical shell 85.

According to the present embodiment, the bearing may be larger than the support shaft and the movable shaft and hence a spherical motor having a high torque and a high output is provided. The signal lines to the pattern member 82 may be accommodated in the shell.

In the above embodiments, since the movable member and the support member act relatively to each other, the movable member may have the pattern member and the support member may have the driven member. The drive force of the motor (e.g. for weight) can be mechanically enhanced by the shell.

Figure 9:
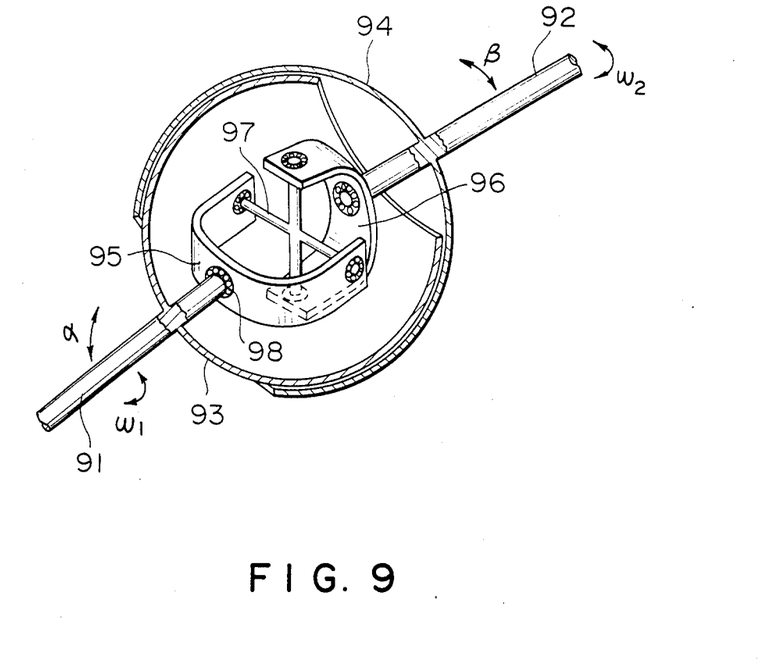
FIG. 9 shows another embodiment of the present invention which uses a flexible joint member.

FIG. 9 shows another embodiment of the present invention. A flexible joint is arranged at a joint between a support shaft 91 and a movable shaft 92 so that a force is transmitted between the support shaft and the movable shaft. The flexible joint comprises a yoke 95 for the support shaft, a cross-shaped member 97 and a yoke 96 for the movable shaft. A shell-shaped spherical pattern member 93 connected to the support shaft 91 and a shell-shaped driven member 94 which is concentric with the pattern member 93 are smoothly rotatably mounted on the flexible joint.

The support shaft 91 is supported by a bearing member 98 to the yoke 95 so that it can be rotated ($W_1$) around the support shaft 91. The support shaft 91 is also rotatable vertically ($\alpha$) to the yoke 96 by the cross-shaped member 97 and the bearing members at the ends thereof. Similarly, the yoke 96 is rotatable horizontally ($\beta$) and around the movable shaft 92 ($W_2$).

The rotation and the drive of the support shaft 91 and the movable shaft 92 are controlled by the pattern member 93 and the driven member 94 on the shells connected to the support shaft and the movable shaft, in three directions of the spherical surface. As shown in FIG. 4, the drive control by the pattern can be readily attained by a microcomputer (not shown) by defining the pattern for the solid angle of a portion of the sphere and supplying digital drive control signals (pulses) to the pattern.

Figure 10:
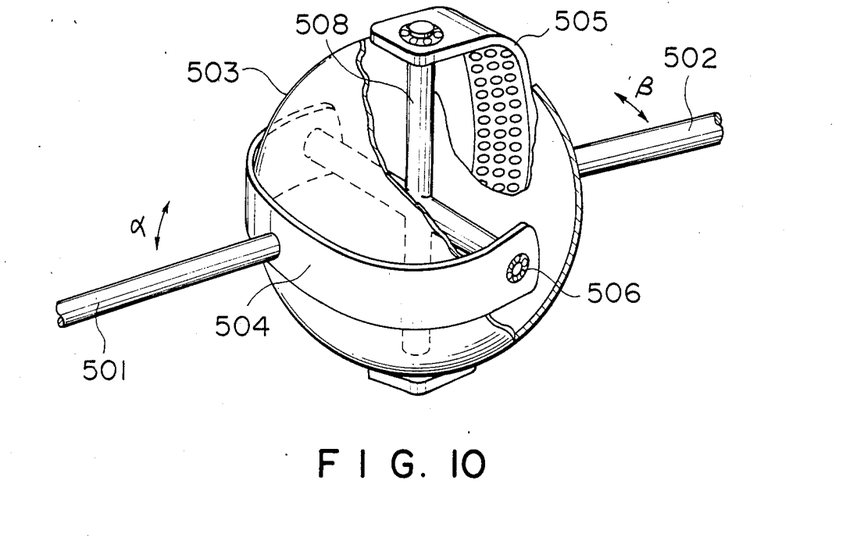
FIG. 10 shows a further embodiment of the present invention.

FIG. 10 shows another embodiment of the present invention.

A support shaft 501 is rotatable vertically ($\alpha$) to a cross-shaped member 508 of a flexible joint by a ball bearing 506. An output shaft 502 is rotatable horizontally ($\beta$) to the cross-shaped member 508 of the flexible joint. A shell-shaped spherical pattern member 503 is arranged inside of a yoke 504 and a yoke 505 of the flexible joint and connected to the cross-shaped member 508 by the bearing member 506. The drive in the $\alpha$ and $\beta$ directions is attained between the yokes and the pattern member 503. The shell-shaped pattern member 503 may be divided into two semi-spherical parts on the opposite sides of the cross-shaped member 508. In this case, the shell parts need not be concentric so long as they are concentric to the respective yokes. The shell need not be spherical but it may be parabolic for a purpose of mechanical reinforcement or a stopper.

Figure 11:
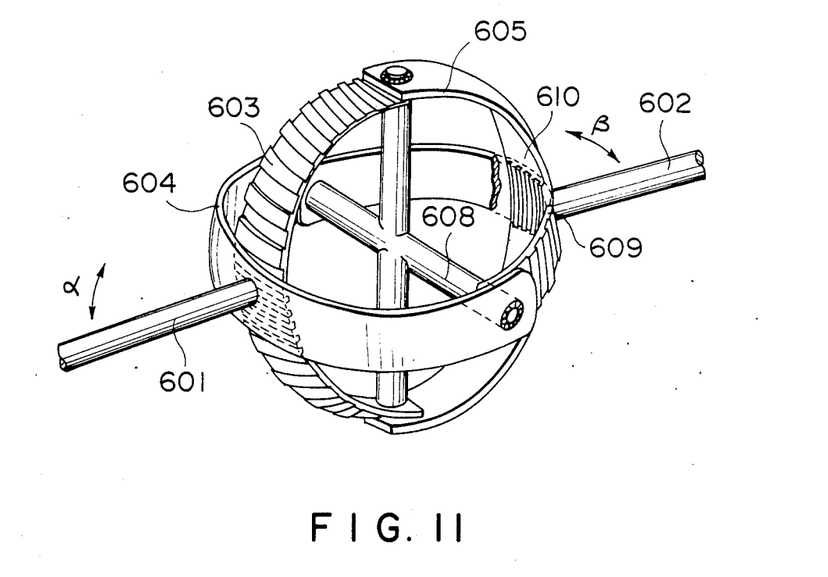
FIG. 11 shows a still further embodiment of the present invention.

FIG. 11 shows other embodiment of the present invention. A support shaft 601 is rotatable vertically ($\alpha$) to a cross-shaped member 608 and a movable shaft 602 is rotatable horizontally ($\beta$) to the cross-shaped member 608. A ring-shaped pattern member 603 having pattern teeth is arranged inside of a yoke 604 orthogonally thereto without contacting the yoke 604 connected to the support shaft 601, and it is fixed to the cross-shaped member 608. A ring-shaped pattern member 609 is arranged inside of a yoke 605 orthogonally thereto without contacting the yoke 605 connected to the movable shaft 602, and it is fixed to the cross-shaped member 78.

The $\beta$-direction drive of the movable shaft 602 is explained below. The drive and the control shown in FIGS. 1 and 2 are applied to the driven pattern 610 on the yoke 605 and the pattern teeth on the pattern member 609 orthogonal to the yoke 605. By applying a digital signal (pulse) to signal lines (not shown) connected to the driven pattern 610 of the yoke 605, the yoke 605 is directly and horizontally ($\beta$) driven. Similarly, the yoke 604 is directly and vertically ($\alpha$) driven. In the present embodiment, the control in two axial directions of the sphere is attained in a similar manner to the two-direction control of the linear pulse motor and the construction is simplified.

In the above embodiments, since the movable member and the support member act relatively to each other, the movable member may have the pattern member and the support member may have the driven member. The flexible joint mechanically reinforce the drive force of the motor (to weight, for example). While the spherical motors are shown in the above embodiments, they need not be spherical. The motor of the present invention can be applied to control a neck or a waist or a robot, or the control articulation of the robot such as its shoulder, hand and foot and to control an the attitude of a head or body of the robot with a degree of freedom of three. The invention is also applicable to control the movement of an eyeball of a robot which can trace a moving article.

The motor of the present invention is also to provide goose-neck motion in a camera or an electric fan to provide, direct drive of a lens, an to the articulation of a paging robot, angle control of a mirror of an automobile, and to control a wiper of an automobile. It is also applicable to control height, angle or movement of a road indicating board, a traffic signal light or an advertising board. It is applicable to control opening and closing a door. The rotation of a cooking plate in a microwave oven can be three-dimensionally controlled with this invention. The three-dimensional motor of the present invention may be used in a washing machine in addition to a conventional rotary motor also. The present motor may be used to feed a paper in an image processing apparatus such as a copying machine or to drive a print element of a typewriter.

As described hereinabove, the present invention provides a small and high precision actuating device which can be applied to various machines and has various applications.

What we claim is:

1. An activating device comprising:
   two members moveable relatively to each other along a sperical surface so that movement of said members is three-dimensional;
   said members being free to move in all directions relative to each other and to move in at least two mutually orthogonal directions relative to said spherical surface,
   a shaft extending from one of said members to be moved therewith; and
   induction means for imparting to said members forces in mutually orthogonal directions along said surfaces for enabling said relative movement.

2. An actuating device set forth in claim 1, wherein each of said movable members has a plurality of tooth members and said induction means provides a magnetic force between corresponding tooth members.

3. An actuating device comprising:
   a first member having a surface which extends in three dimensions;
   two members moveable relatively to each other, the movement of each of said two members being along said surface which extends in three dimensions;
   connection means for connecting said moveable members to each other; and
   means for moving said moveable members relatively to said surface of said first member;
   wherein said connection means comprises a flexible joint.

4. An actuating device as set forth in claim 3, wherein said moving means includes a plurality of members for imparting a force to at least one of said two members.

5. An actuating device as set forth in claim 3, wherein said connection means is supported by a spherical bearing member via a ball bearing.

6. An actuating device comprising:
   a first member having a surface which extends in three dimensions;
   at least two moveable members moveable relatively to each other, the movement of said moveable members being along said surface that extends in three dimensions; and
   induction means for inducing a force for enabling said relative movement of said moveable members;
   wherein said first member includes means for holding the portion of said moveable members driven by said induction means.

7. An actuating device as set forth in claim 6, wherein said means for holding comprises a shell pivotally connected to said movable members.

* * * * *

UNITED STATES PATENT AND TRADEMARK OFFICE
CERTIFICATE OF CORRECTION

PATENT NO. : 4,707,642

DATED : November 17, 1987

INVENTOR(S) : KANEHIRO SORIMACHI, ET AL.

It is certified that error appears in the above-identified patent and that said Letters Patent is hereby corrected as shown below:

COLUMN 1

Line 45, "coil (B)." should read --coil B).--.

COLUMN 2

Line 11, "other" should read --another--.
Line 15, "orticulation" should read --articulation--.

COLUMN 3

Line 9, "pattern 55" should read --pattern member 55--.
Line 14, "P'x and P'y" should read --Px' and Py'--.
Line 16, "P'x/n" should read --Px'/n--.

COLUMN 4

Line 31, "other" should read --another--.
Line 42, "78." should read --608.--.
Line 60, "reinforce" should read --reinforces--.
Line 64, "or" (second occurrence) should read --of--.
Line 64, "or the" should read --or to--.
Line 66, delete "an".

UNITED STATES PATENT AND TRADEMARK OFFICE
CERTIFICATE OF CORRECTION

PATENT NO. : 4,707,642
DATED : November 17, 1987
INVENTOR(S) : KANEHIRO SORIMACHI, ET AL.

It is certified that error appears in the above-identified patent and that said Letters Patent is hereby corrected as shown below:

COLUMN 5

Line 3, "also to" should read --also applicable to--.
Line 4, "fan to" should read --fan, to--.
Line 5, "provide," should read --provide--.
Line 5, delete "an".
Line 9, "road indicating" should read --road-indicating--.
Line 24, "activating" should read --actuating--.
Line 26, "sperical" should read --spherical--.

Signed and Sealed this

Twelfth Day of April, 1988

Attest:

DONALD J. QUIGG

Attesting Officer

Commissioner of Patents and Trademarks